US009229743B2

(12) United States Patent
Sundaresan et al.

(10) Patent No.: US 9,229,743 B2
(45) Date of Patent: Jan. 5, 2016

(54) PREVENTION OF CLASSLOADER MEMORY LEAKS IN MULTITIER ENTERPRISE APPLICATIONS

(75) Inventors: Vijay Sundaresan, North York (CA); Andres H. Voldman, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 979 days.

(21) Appl. No.: 13/243,508

(22) Filed: Sep. 23, 2011

(65) Prior Publication Data

US 2013/0080706 A1 Mar. 28, 2013

(51) Int. Cl.
*G06F 9/44* (2006.01)
*G06F 12/02* (2006.01)
*G06F 12/08* (2006.01)
*G06F 9/445* (2006.01)

(52) U.S. Cl.
CPC ........ *G06F 9/44521* (2013.01); *G06F 12/0253* (2013.01); *G06F 12/0802* (2013.01)

(58) Field of Classification Search
None
See application file for complete search history.

(56) References Cited

U.S. PATENT DOCUMENTS

| 6,430,570 B1 * | 8/2002 | Judge et al. .................. 717/166 |
| 7,496,615 B2 | 2/2009 | Broussard |
| 7,600,223 B2 | 10/2009 | Massarenti et al. |
| 7,793,304 B2 | 9/2010 | Schank et al. |
| 7,890,537 B2 * | 2/2011 | Kasten et al. ................. 707/793 |
| 2004/0261069 A1 * | 12/2004 | Verbeke et al. ............... 717/166 |
| 2010/0205230 A1 | 8/2010 | Simeonov et al. |

FOREIGN PATENT DOCUMENTS

WO 2008134163 A1 11/2008

OTHER PUBLICATIONS

Miron Sadziak, Java ClassLoader (2)—Write your own ClassLoader, Apr. 15, 2010, javablogging.com.*
Laurent Amsaleg, et al., Garbage Collection for a Client-Server Persistent Object Store, Journal: ACM Transactions on Computer Systems (TOCS), Aug. 1999, pp. 153-201, vol. 17, Issue 3, Association for Computing Machinery, New York, NY, USA.
United States Patent and Trademark Office, Office Action for U.S. Appl. No. 13/434,151, May 9, 2014, pp. 1-24, Alexandria, VA, USA.
United States Patent and Trademark Office, Office Action for U.S. Appl. No. 13/434,151, Nov. 20, 2014, pp. 1-28, Alexandria, VA, USA.

* cited by examiner

*Primary Examiner* — Qing Wu
*Assistant Examiner* — Wynuel Aquino
(74) *Attorney, Agent, or Firm* — Lee Law, PLLC; Christopher B. Lee (57) ABSTRACT

A classloader cache class definition is obtained by a processor. The classloader cache class definition includes code that creates a classloader object cache that is referenced by a strong internal reference by a classloader object in response to instantiation of the classloader cache class definition. A classloader object cache is instantiated using the obtained classloader cache class definition. The strong internal reference is created at instantiation of the classloader object cache. A public interface to the classloader object cache is provided. The public interface to the classloader object cache operates as a weak reference to the classloader object cache and provides external access to the classloader object cache.

16 Claims, 4 Drawing Sheets

PREVENTION OF CLASSLOADER MEMORY LEAKS IN MULTITIER ENTERPRISE APPLICATIONS

BACKGROUND

The present invention relates to memory leak prevention. More particularly, the present invention relates to prevention of classloader memory leaks in multitier enterprise applications.

Memory leaks may occur in association with computer applications. Memory leaks result from memory allocations that are not released when allocated memory is no longer in use by an application, but is not reclaimed for other uses. Garbage collection is performed to attempt to reclaim unused memory. Garbage collection is often performed during configured time periods to reduce interruption of system operation.

BRIEF SUMMARY

A method includes obtaining, via a processor, a classloader cache class definition that comprises code that creates a classloader object cache that is referenced via a strong internal reference by a classloader object in response to instantiation of the classloader cache class definition; instantiating a classloader object cache using the obtained classloader cache class definition, where the strong internal reference is created at instantiation of the classloader object cache; and providing a public interface to the classloader object cache that operates as a weak reference to the classloader object cache and that provides external access to the classloader object cache.

A system includes a memory and a processor programmed to obtain a classloader cache class definition that comprises code that creates a classloader object cache that is referenced via a strong internal reference by a classloader object in response to instantiation of the classloader cache class definition; instantiate a classloader object cache within the memory using the obtained classloader cache class definition, where the strong internal reference is created at instantiation of the classloader object cache; and provide a public interface to the classloader object cache that operates as a weak reference to the classloader object cache and that provides external access to the classloader object cache.

A computer program product includes a computer readable storage medium including computer readable program code, where the computer readable program code when executed on a computer causes the computer to obtain a classloader cache class definition that comprises code that creates a classloader object cache that is referenced via a strong internal reference by a classloader object in response to instantiation of the classloader cache class definition; instantiate a classloader object cache using the obtained classloader cache class definition, where the strong internal reference is created at instantiation of the classloader object cache; and provide a public interface to the classloader object cache that operates as a weak reference to the classloader object cache and that provides external access to the classloader object cache.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides for prevention of classloader memory leaks in multitier enterprise applications. The present subject matter facilitates the use of caches that point to application objects/classes from server code (e.g., code that was not loaded by the application classloader). The present subject matter defines the concept of an "application cache." The application cache as referenced herein represents a cache that is defined by the server in the application space. A strong internal reference to a cache is provided within a classloader to prevent garbage collection while application objects are still intended to be cached. The server uses a weak external reference to place objects on the cache and to remove objects from the cache. When the application is stopped, the associated cache is automatically removed with the application, along with the strong reference being automatically removed. The only reference that remains is the weak reference from the server. The weak reference does not prevent garbage collection and, as such, garbage collection of the memory allocated to the cache may occur in a situation where garbage collection would otherwise be prevented.

As such, the processor executing the code will create this cache under the application classloader and not within the server environment, so that the cache may be destroyed with the application, which prevents this particular memory leak or a need for development of additional processing steps during code development that are executed when the application is stopped. Accordingly, the present subject matter automates the maintenance of a cache because the cache will be automatically destroyed when the application is stopped, along with the only strong reference to the cache. By using this mechanism, developers do not need to worry about clearing the cache when the application is stopped or keeping track of every single server object that may reference a respective application.

As described in more detail below, the present subject matter is based upon recognition of a technique that may be used to create a class implementation (e.g., Application- ClassImpl) dynamically in the context of any application classloader that is visible to the server. This is achieved by using the bytes from a class written in advance (and that may be loaded at any time). These bytes may be copied into the new class that is created in the context of the application classloader. Once the new class is created using a combination of dynamic class loading and definition, a strong reference (e.g., a pointer) to the cache is established that holds application objects/classes via a static field declared within the newly created class. This strong reference from the static field in the newly-defined class allows the server code to refer to the cache via a weak reference. The strong reference within the classloader prevents the cache from getting garbage collected prematurely, while the weak reference from the server allows garbage collection of the cache to occur in response to the application being stopped or unloaded. As such, the server code may freely add/remove application objects/classes relating to the particular application classloader to/from this cache without requiring overhead associated with memory management of the cache.

When the application code has finished executing and the application classloader is about to be unloaded, the cache also gets reclaimed without any intervention from the server or application code. Since there is no strong reference from the server code to the cache, the application classloader may be unloaded at the same point as it would have if the server cache for the application classloader had not existed at all. When the application classloader is unloaded, the static field in the newly-created class is no longer considered a live reference to the cache, and therefore the cache may be collected as garbage (e.g., reclaimable memory) after the application classloader is unloaded. As described, the only other reference to the cache that remains is the weak reference from the server, which does not prevent garbage collection, because this weak reference is not relevant for the garbage collection scan for live pointers. As such, garbage collection of the cache proceeds and memory leaks may be prevented.

The present subject matter prevents what is referred to herein by the phrase "classloader memory leak," which refers to situations where server code maintains a strong reference to a class loaded by an application from outside of the application classloader that remains after the application is stopped. This remaining external strong reference prevents the application's classloader from being garbage collected. This may lead to memory waste or out of memory (OOM) issues (depending on the size of the application and number of restarts).

It should be noted that the examples above for the classloader used to create the cache used the current thread's classloader. However, the classloader used to create the cache may be obtained through different processing. For example, in the context of an application server, a thread running application code may typically have its classloader set to the application classloader. Other examples of classloaders that may be used are the classloader class of the object to be cached or the classloader class of the method that is executing. For purposes of the present description, such classloaders may be considered "target" classloaders, and the present subject matter may be applied to any such target classloaders.

The cache that is created by the target classloader may then be associated with the classloader used via a strong reference, and the cache may also be reclaimed through garbage collection when the classloader is unloaded. As such, the particular classloader used may be a classloader other than the server classloader that allows the server to maintain a weak reference, rather than a strong reference, to the respective classloader cache. Using a classloader other than the server classloader may prevent a strong reference from the server from being created. Without a strong reference from the server, memory consumed by the cache may be reclaimed after the respective classloader is unloaded.

The present subject matter may be utilized in a variety of system implementations. For example, the present subject matter may be implemented within a multitier component-based enterprise application environment, such as a Java 2 Platform, Enterprise Edition (J2EE®) environment. However, it is understood that the present subject matter may be applied to any operating environment or platform as appropriate for a given implementation. Accordingly, any such operating environment or platform is considered within the scope of the present subject matter.

It should be noted that conception of the present subject matter resulted from recognition of certain limitations associated with classloader-related memory leaks and garbage collection in situations where a server maintains a strong reference from outside of an application classloader to a class loaded by an application. It was recognized that because the strong reference remains after the application is stopped, this remaining external reference prevents the application's classloader from being garbage collected, which leads to memory waste or potentially out of memory (OOM) issues depending on the size of the application and number of application restarts. The present subject matter improves classloader related memory issues by creating a new class using a combination of dynamic class loading and class definition. A pointer (strong reference) to a classloader cache that holds application objects/classes is created using a static field declared within the newly created class. As such, a strong reference to the classloader cache exists, but the server may maintain a weak external reference to the classloader cache instead of a strong reference. As such, when the application is finished executing and the application classloader is unloaded, only the weak reference from the server remains. This remaining weak reference does not prevent garbage collection. Accordingly, the cache also gets reclaimed without any intervention from the server or application code, which prevents a memory leak. Additionally, neither the server code nor the application code are required to provide any memory management functionality (e.g., no call back method from the server to clean up the cache once the application is stopped), which improves portability of the application code. As such, the present subject matter improves situations where, for example, server code needs to implement a cache to maintain application objects. In such a situation using prior technologies, a strong reference from the server to the cache prevented garbage collection when the application is unloaded. Further, the present subject matter also alleviates code developer burdens by removing a need to add code that triggers during shutdown to manually empty the references to the classes that belong to the application being stopped, which is error prone if all classes are not added to the list that will be cleaned during shutdown. Accordingly, improved memory management and application code portability may be obtained through use of the prevention of classloader memory leaks in multitier enterprise applications described herein.

The following pseudo syntax examples provide context for the description of the figures that are described following the pseudo syntax examples. The following first pseudo syntax example represents one possible implementation of a new "ClassloaderCache" module "interface" that may be implemented, as described in more detail below, and that may be used by a server to access and operate on a cache.

```
public interface ClassloaderCache {
    public static final String CL_CACHE_IMPL_RES =
        "/com/company/websphere/cache/ClassloaderCacheImpl.class";
    public static final String CL_CACHE_IMPL_CLASS =
        "com.company.websphere.cache.ClassloaderCacheImpl";
    public Object get(Object key);
    public void put(Object key, Object value);
}
```

Within the first pseudo syntax example of the ClassloaderCache module, a public static string constant is defined called "CL_CACHE_IMPL_RES." This string constant identifies a path to the class file that defines a "ClassloaderCacheImpl" class. The ClassloaderCacheImpl class is an implementation of the ClassloaderCache interface.

Similarly, a public static string constant is defined called "CL_CACHE_IMPL_CLASS." This string constant identifies a name of the ClassloaderCacheImpl class that is an implementation of the ClassloaderCache interface.

A "get( )" method signature represents a routine that provides a facility method that may be used to obtain an object from the cache based on a key passed to the routine. The "put( )" method signature represents a routine that provides a facility method that may be used to add an object to the cache based on a key passed to the routine.

As such, the first pseudo syntax example of the ClassloaderCache module provides a public interface for a classloader cache. This public interface may be used to obtain objects from the classloader cache and add objects to the classloader cache.

The following second pseudo syntax example represents one possible implementation of a new "ClassloaderCacheImpl" class that implements the ClassloaderCache defined via the ClassloaderCache interface described above within the first pseudo syntax example.

```
public class ClassloaderCacheImpl implements ClassloaderCache {
    protected ClassloaderCacheImpl( ) { }
    private HashMap <Object, Object> myHash = new HashMap
        <Object, Object>( );
    public Object get(Object key) {
        return myHash.get(key);
    }
    public void put(Object key, Object value) {
        myHash.put(key, value);
    }
    static private ClassloaderCacheImpl cache = null;
    public static ClassloaderCacheImpl getInstance( ) {
        if ( cache == null ) {
            cache = new ClassloaderCacheImpl( );
        }
        return cache;
    }
}
```

Within the second pseudo syntax example of the ClassloaderCacheImpl class, this class is implemented using a single pattern. A class constructor "ClassloaderCacheImpl( )" is defined as "protected." The class uses a private hash map ("HashMap") to cache objects. It should be noted that there are several ways of implementing caches, and this hash map implementation was selected for the purpose of the example. It is understood that any other implementation may be utilized as appropriate for a given implementation.

The get( ) routine represents a facility method that may be used to internally retrieve objects from the cache based on a key. Similarly, the put( ) routine represents a facility method that may be used to add objects to the cache. The parameters are the object itself and the key that may be used to later retrieve the object using the get( ) method.

A cache variable with "static" and "private" properties of type ClassloaderCacheImpl is used for the single pattern, and is initially set to "null." In addition to the interface methods defined within the ClassloaderCache interface described above within the first example pseudo syntax, the ClassloaderCacheImpl class provides an additional method called "getInstanceQ" that represents a public interface method that will return an instance of the created classloader cache. The getInstance( ) method populates the cache variable if an instance already exists. The conditional "cache==null" determines whether an instance of a cache was returned by the "getInstance( )" method. This method may be executed using reflection to instantiate the cache, as described in more detail below. If an instance was not returned, a new ClassloaderCacheImpl cache will be created using the "ClassloaderCacheImpl( )" class definition and the cache is returned. An object of this class will be instantiated under a specified classloader and will be released in response to the application being unloaded, which will help prevent memory leaks as described above and in more detail below.

The following third pseudo syntax example represents one possible implementation of syntax for obtaining an instance of a ClassLoaderCache called "createClassloaderCache( )" As described above, the ClassLoaderCache is a cache that is created for a given classloader.

```
protected ClassLoaderCache createClassloaderCache( ) throws Exception {
    ClassLoader cLoader =
        Thread.currentThread( ).getContextClassLoader( );
    ClassLoaderCache clCache = null;
    InputStream inStream =
        this.getClass( ).-
        getResourceAsStream(CL_CACHE_IMPL_RES);
    ByteArrayOutputStream buffer = new ByteArrayOutputStream( );
    int data = inStream.read( );
    while (data != -1) {
        buffer.write(data);
        data = inStream.read( );
    }
    inStream.close( );
    byte[ ] classData = buffer.toByteArray( );
    Class myAppClass =
cLoader.defineClass(CL_CACHE_IMPL_CLASS,
classData, 0, classData.length);
    Method mthd = myAppClass.getMethod("getInstance", null);
    clCache = (ClassLoaderCache) mthd.invoke(null, null);
    return clCache;
}
```

Within the third pseudo syntax example of the createClassloaderCache( ) method, the call to the "Thread.currentThread( ).getContextClassLoader( )" method is used to obtain the classloader associated with the current thread. The cache will be created under this classloader. The server may set this thread's classloader to be the application classloader before it starts executing application code on this thread.

A classloader cache variable "clCache" is initialized to null. The "CL_CACHE_IMPL_RES" static string described above within the ClassloaderCache interface, that identifies the path to the class file that defines a "ClassloaderCacheImpl" class, is used to load the bytes stored in the class file using an InputStream called "inStream." The InputStream is then read in and closed. The data read in from the InputStream is used to create a byte array called "classData" to hold the contents of the class file in memory.

A new class named "myAppClass" is dynamically created using the "CL_CACHE_IMPL_CLASS" static string described above within the ClassloaderCache interface that identifies the name of the class in the context of the current thread's classloader. The contents of the new class are in the byte array classData that was created as described above (e.g., in the previous line of the example syntax). Because the "defineClass" method is a protected method in the ClassLoader, the example pseudo syntax as shown in this example is assumed to be implemented in a method in a subclass of the ClassLoader. However, it should be noted that there are other ways of instantiating a class in a given classloader that may be used in other contexts (e.g.Class.forName or reflection), and any such alternatives may be used as appropriate for a given implementation.

Reflection is then used to obtain the static method named "getInstance( )" that was defined above within the ClassloaderCacheImpl class from the myAppClass that was dynamically created on the previous line. The getInstance( ) method reference is assigned to the method variable "mthd." The static method "getInstance" in the newly created class myAppClass is executed (e.g., mthd.invoke) and the classloader cache variable "clCache" is assigned using the returned classloader cache. The instance of the classloader cache that was created is then returned.

As such, the pseudo syntax examples above show an example set of processing to create a cache with a strong reference within the classloader. This cache may be referenced using a weak reference from a server using a public interface defined within an "interface" module and implemented within a module that implements the defined interface. Accordingly, when the classloader is unloaded, the only reference that remains is the weak reference from the server. The weak reference from the server will not prevent garbage collection and the memory allocated for the cache may be reclaimed without additional processing.

The prevention of classloader memory leaks in multitier enterprise applications described herein may be performed in real time to allow prompt allocation of classloader caches and prompt reclamation of memory consumed by classloader caches when the respective classloaders are unloaded. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
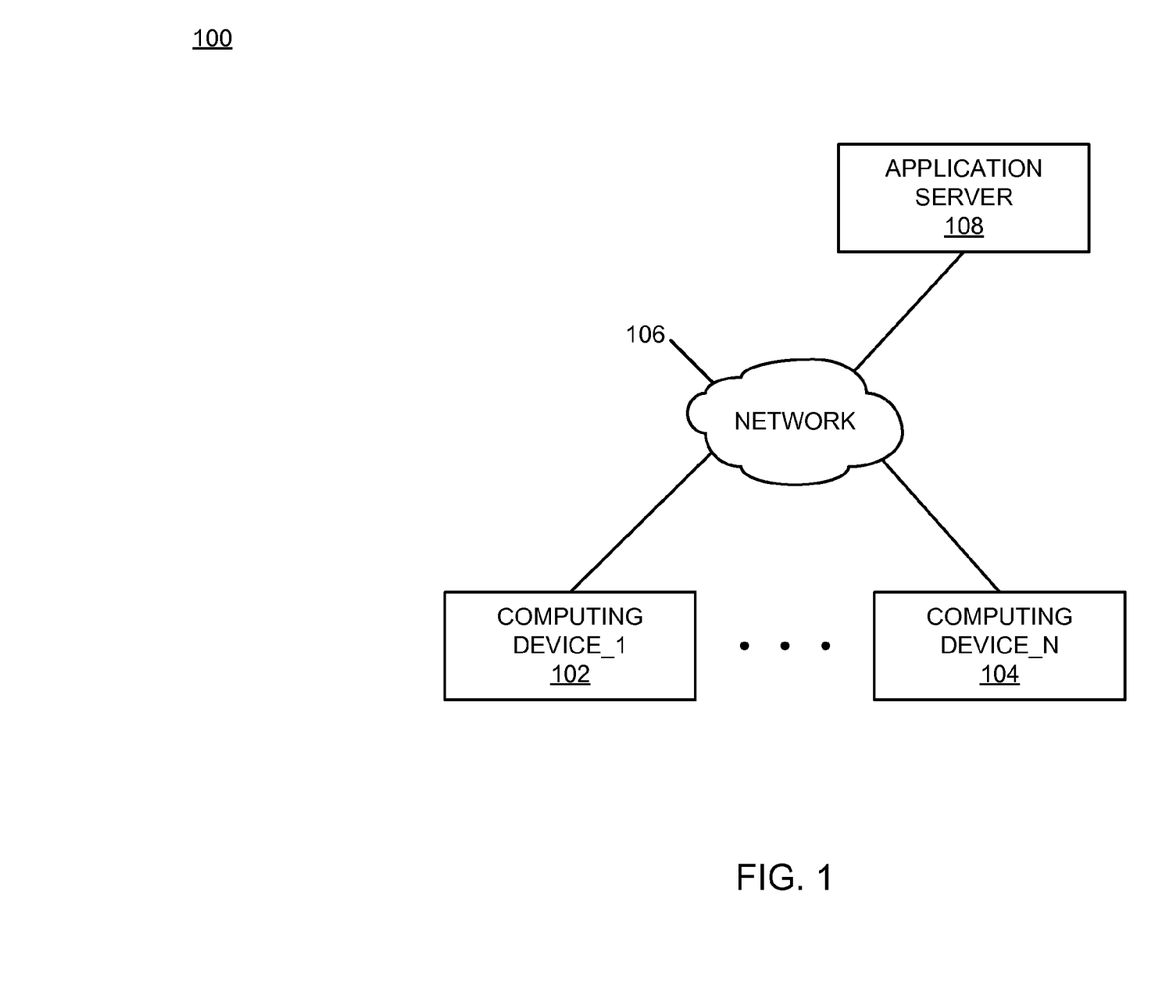
FIG. 1 is a block diagram of an example of an implementation of a system for prevention of classloader memory leaks in multitier enterprise applications according to an embodiment of the present subject matter.

FIG. 1 is a block diagram of an example of an implementation of a system 100 for prevention of classloader memory leaks in multitier enterprise applications. A computing device_1 102 through a computing device_N 104 communicate via a network 106 with an application server 108.

As will be described in more detail below in association with FIG. 2 through FIG. 4, the application server 108 provides automated prevention of classloader memory leaks in multitier enterprise applications. The automated prevention of classloader memory leaks in multitier enterprise applications is based upon creation of a classloader cache within a classloader object rather than at a server-level application layer within the application server 108. A strong reference is provided to the classloader cache within the classloader object to prevent the classloader cache from being garbage collected while still in use. A weak reference to the classloader cache is provided via a public interface to the classloader cache. As such, when the classloader cache is unloaded, the strong reference is unloaded with the classloader cache and only the weak reference remains. The weak reference does not prevent garbage collection and the classloader cache may be garbage collected and removed from memory without server level application overhead and without additional classloader class unloading overhead.

It should be noted that the computing device_1 102 through the computing device_N 104 may be portable computing devices, either by a user's ability to move the computing devices to different locations, or by the computing devices being association with a portable platform, such as a plane, train, automobile, or other moving vehicle. It should also be noted that the computing devices may be any computing device capable of processing information as described above and in more detail below. The computing device_1 102 through the computing device_N 104 may each include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The application server 108 may include any device capable of providing data for consumption by a device, such as the computing device_1 102, via a network, such as the network 106. Further, the application server 108 may also include web server or other data server device capabilities without departure from the scope of the present subject matter. For purposes of the present subject matter, the application server 108 provides one or more multitier enterprise applications that may be accessed by the computing device_1 102 through the computing device_N 104.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
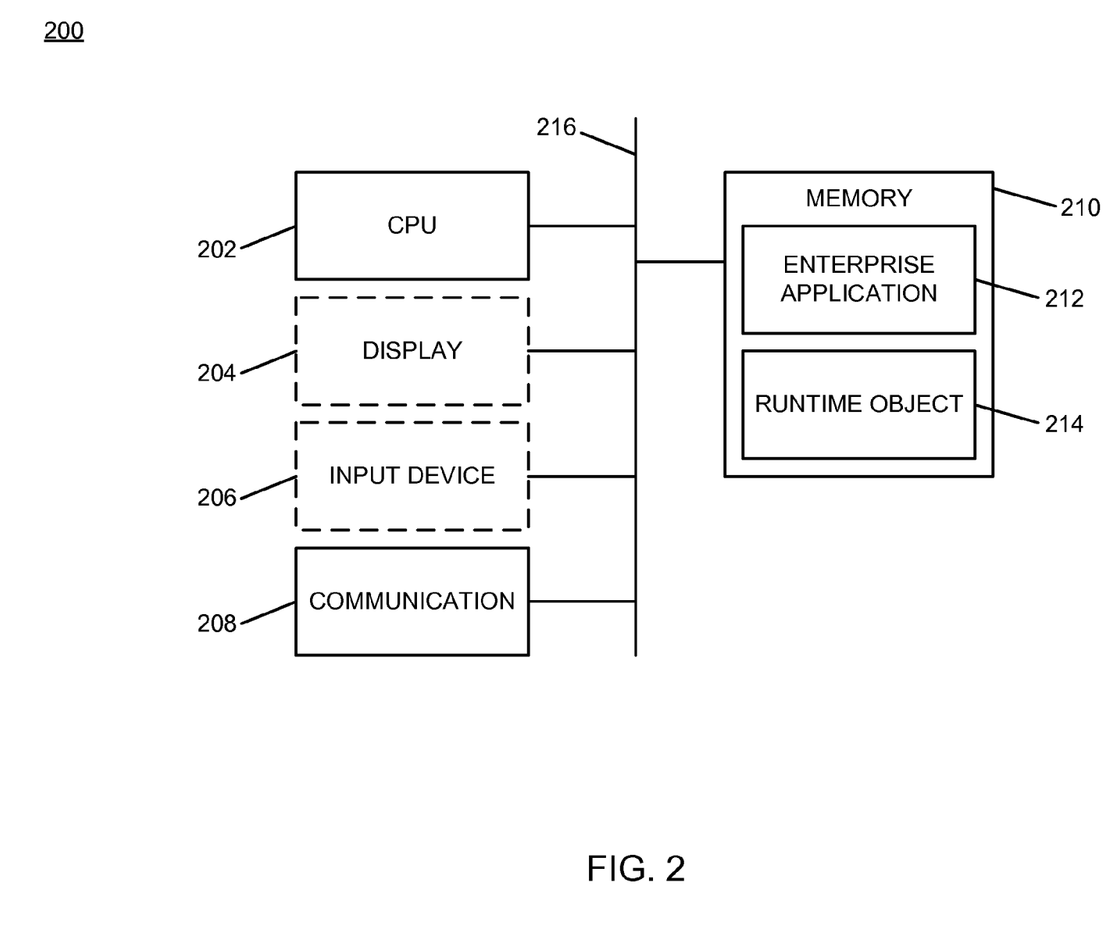
FIG. 2 is a block diagram of an example of an implementation of a core processing module capable of performing automated prevention of classloader memory leaks in multitier enterprise applications according to an embodiment of the present subject matter.

FIG. 2 is a block diagram of an example of an implementation of a core processing module 200 capable of performing automated prevention of classloader memory leaks in multitier enterprise applications. While the present subject matter provides the application server 108 for performance of the automated prevention of classloader memory leaks in multitier enterprise applications, this should not be considered limiting. As such, the core processing module 200 may be associated with any of the computing device_1 102 through the computing device_N 104 in the alternative or in addition to being associated with the server 108, as appropriate for a given implementation. Further, the core processing module 200 may provide different and complementary processing for prevention of classloader memory leaks in multitier enterprise applications in association with each implementation, as described in more detail below.

As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes an enterprise application area 212 that stores and provides executable space for one or more enterprise applications executed by the CPU 202. A runtime object storage area 214 provides memory that is allocated to runtime objects, including classloader caches, as described above and in more detail below.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

It is understood that enterprise applications may include instructions executed by the CPU 202 for performing the functionality described herein. The CPU 202 may execute these instructions to provide the processing capabilities described above and in more detail below for the core processing module 200. Enterprise applications may be executed by an operating system that is stored and executed within the enterprise application area 212 of the memory 210 of the core processing module 200.

The CPU 202, the display 204, the input device 206, the communication module 208, and the memory 210 are interconnected via an interconnection 216. The interconnection 216 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter.

Figure 3:
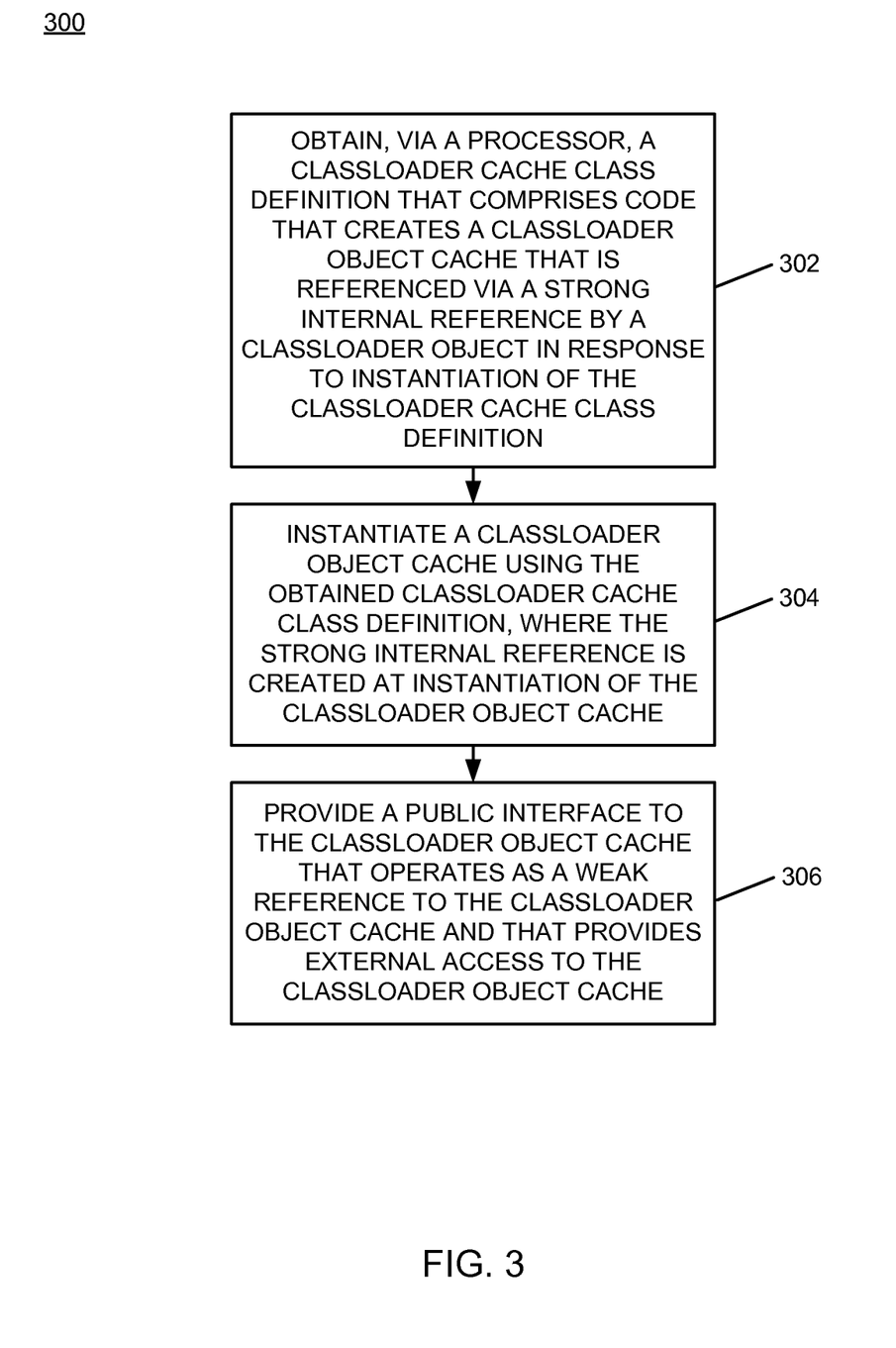
FIG. 3 is a flow chart of an example of an implementation of a process for automated prevention of classloader memory leaks in multitier enterprise applications according to an embodiment of the present subject matter.
Figure 4:
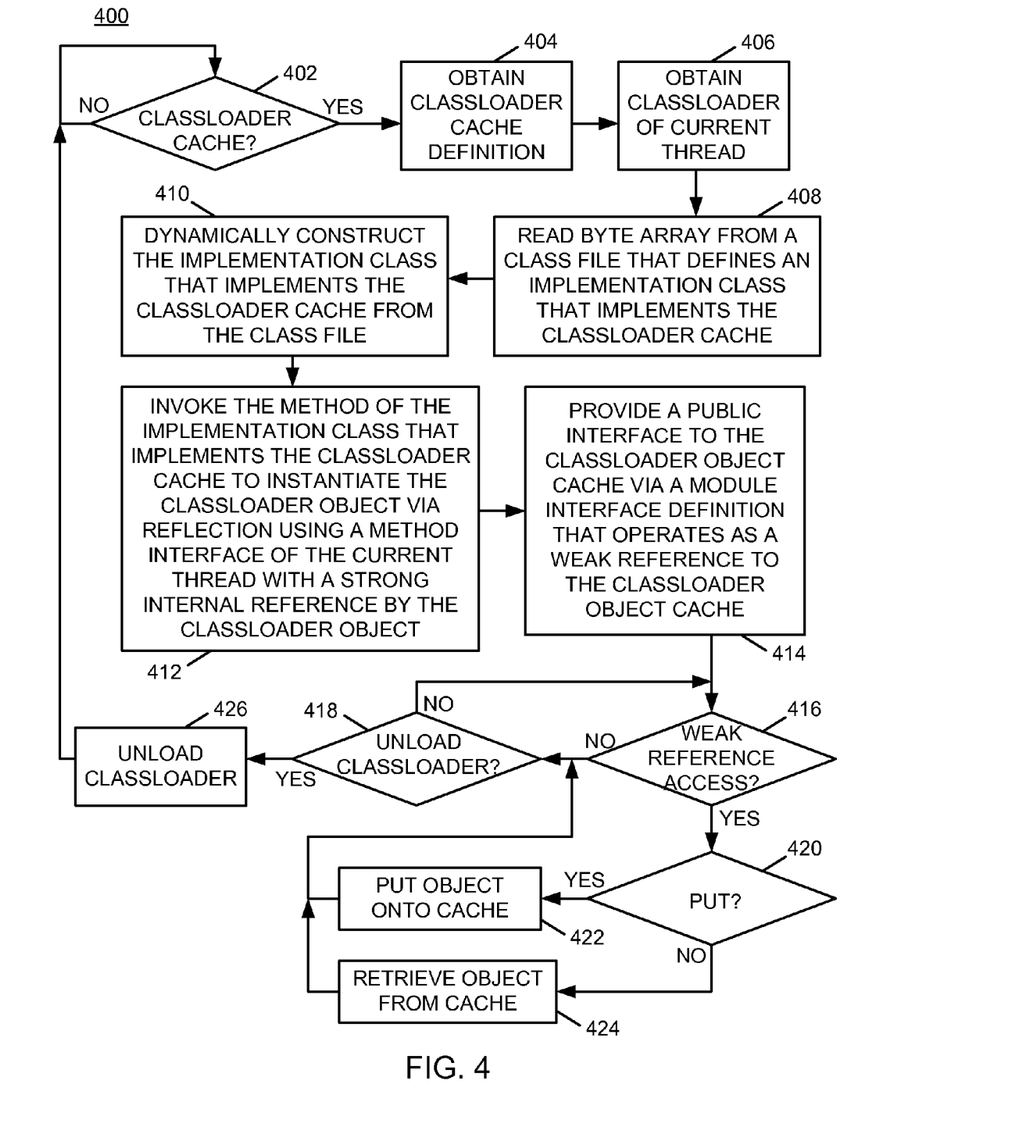
FIG. 4 is a flow chart of an example of an implementation of a process for automated prevention of classloader memory leaks in multitier enterprise applications according to an embodiment of the present subject matter.

FIG. 3 through FIG. 4 described below represent example processes that may be executed by devices, such as the core processing module 200, to perform the automated prevention of classloader memory leaks in multitier enterprise applications associated with the present subject matter. Many other variations on the example processes are possible and all are considered within the scope of the present subject matter. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added without departure from the scope of the present subject matter.

FIG. 3 is a flow chart of an example of an implementation of a process 300 for automated prevention of classloader memory leaks in multitier enterprise applications. At block 302, the process 300 obtains, via a processor, a classloader cache class definition that comprises code that creates a classloader object cache that is referenced via a strong internal reference by a classloader object in response to instantiation of the classloader cache class definition. At block 304, the process 300 instantiates a classloader object cache using the obtained classloader cache class definition, where the strong internal reference is created at instantiation of the classloader object cache. At block 306, the process 300 provides a public interface to the classloader object cache that operates as a weak reference to the classloader object cache and that provides external access to the classloader object cache.

FIG. 4 is a flow chart of an example of an implementation of a process 400 for automated prevention of classloader memory leaks in multitier enterprise applications. The several sections of example pseudo syntax above provide detailed syntactic examples of certain aspects of the processing described below and reference is made to those sections and the description above for clarity with respect to the processing described below.

At decision point 402, the process 400 makes a determination as to whether a request to create a classloader cache has been detected. As described above and in more detail below, the classloader cache may be created within a classloader domain (rather than a server domain) with a strong internal reference to the cache to prevent garbage collection of the classloader cache while the cache is in use. The classloader cache is externally accessible from the server domain via a weak reference using a public interface to the classloader cache.

In response to determining that a request to create a classloader cache has been detected, the process 400 obtains a classloader cache class definition that includes code that creates a classloader object cache that is referenced via a strong internal reference by a classloader object in response to instantiation of the classloader cache class definition at block 404. As described above, the strong reference may include a static reference to the classloader cache within an implementation class that implements the classloader cache.

At block 406, the process 400 obtains the classloader of a current thread. At block 408, the process 400 reads a byte array from a class file that defines an implementation class that implements the classloader cache. As described above, a path to the class file may be defined within a module interface definition that defines the public interface to the classloader object cache. The public interface to the classloader object cache may be provided within the module interface definition that operates as a weak reference to the classloader object cache and provides external access to the classloader object cache. As such, the process 400 may read the byte array from the class file via the path to the class file defined within such a module interface definition. Instantiation of the classloader cache may be performed using reflection, as described above, based upon the obtained classloader of the current thread. As additionally noted above, the classloader object cache may be defined as a hash map or any other type of data structure as appropriate for a given implementation.

At block 410, the process 400 dynamically constructs (e.g., instantiates) the implementation class that implements the classloader cache from the class file. At block 412, the process 400 invokes a method of the implementation class that implements the classloader cache. Invocation of the method of the implementation class that implements the classloader cache may be performed using reflection using a method interface of the current thread. At block 414, the process 400 provides a public interface to the classloader object cache that operates as a weak reference to the classloader object cache and that provides external access to the classloader object cache.

At decision point 416, the process 400 makes a determination as to whether a weak reference cache access to the classloader cache via the public interface has been detected. In response to determining that a weak reference to the classloader cache has not been detected the process 400 begins a higher-level iteration by making a determination at decision point 418 as to whether a request to unload the classloader within which the classloader cache and the strong reference to the classloader cache was created has been detected. In response to determining that a request to unload the classloader within which the strong reference to the classloader cache was created has not been detected, the process 400 returns to decision point 416 and iterates as described above.

Returning to the description of decision point 416, in response to determining that a weak reference cache access to the classloader cache via the public interface has been detected, the process 400 makes a determination at decision point 420 as to whether the weak reference cache access request was an object "put" request or an object "get" request. For purposes of the present example, it is understood that a "get" request would be inoperative until at least one object was placed on the classloader cache. As such, in response to determining at decision point 420 that the weak reference cache access request was an object "put" request, the process 400 puts the object associated with the "put" request onto the created classloader cache at block 422. Similarly, for example in association with a subsequently-detected weak reference cache access, in response to determining at decision point 420 that the weak reference cache access request was an object "get" request, the process 400 retrieves/gets the requested object associated with the "get" request from the created classloader cache at block 424. In response to either putting an object onto the created classloader cache at block 422 or in response to retrieving the requested object from the created classloader cache at block 424, the process 400 returns to decision point 418 and iterates as described above.

In response to determining at decision point 418 that a request to unload the classloader within which the classloader cache and the strong reference to the classloader cache was created has been detected, the process 400 unloads the classloader cache including the strong reference to the classloader cache at block 426. It is understood that the only remaining reference to the cache is the weak reference from the server level. As such, garbage collection may occur at the next scheduled or unscheduled time and the memory allocated to the classloader cache and the strong reference may be collected. Accordingly, memory leaks associated with allocation of the classloader cache may be prevented. The process 400 may be modified to implement the garbage collection processing without departure from the scope of the present subject matter. The process 400 returns to decision point 402 and iterates as described above.

As such, the process 400 obtains a classloader cache definition and constructs/instantiates a classloader cache within a classloader domain, not a server domain. A strong reference to the classloader cache is created within the classloader domain and a weak reference is provided for external access to the classloader cache. The strong reference prevents garbage collection of the classloader cache while the cache is in use, and the weak reference that remains after the classloader is unloaded does not prevent garbage collection of the cache when the classloader has been unloaded and the cache is no longer in use.

As described above in association with FIG. 1 through FIG. 4, the example systems and processes provide prevention of classloader memory leaks in multitier enterprise applications. Many other variations and additional activities associated with prevention of classloader memory leaks in multitier enterprise applications are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising: a memory; and a processor programmed to: obtain a classloader cache class definition that comprises code that creates a classloader object cache that is referenced via a strong internal reference by a classloader object in response to instantiation of the classloader cache class definition; instantiate the classloader object cache within the memory using the obtained classloader cache class definition, where the strong internal reference is created at instantiation of the classloader object cache; and provide a public interface to the classloader object cache that operates as a weak reference to the classloader object cache and that provides external access to the classloader object cache; where the strong internal reference comprises a static reference to the classloader object cache within an implementation class that implements the classloader object cache and the weak reference to the classloader object cache allows garbage collection of the classloader object cache to occur in response to the classloader object cache being unloaded.

2. The system of claim 1, where the processor is further programmed to unload the classloader object cache, where the strong internal reference is unloaded with the classloader object cahe and the classloader object cache is garbage collected.

3. The system of claim 1, where, in being programmed to instantiate the classloader object cache within the memory using the obtained classloader cache class definition, the processor is programmed to:
obtain the classloader of a current thread operated via the processor; and
instantiate the classloader object cache within the memory via reflection using a method interface of the current thread.

4. The system of claim 3, where, in being programmed to instantiate the classloader object cache within the memory via reflection using the method interface of the current thread, the processor is programmed to invoke a method of the implementation class that implements the classloader object cache.

5. The system of claim 1, where, in being programmed to instantiate the classloader object cache within the memory using the obtained classloader cache class definition, the processor is programmed to: read a byte array from a class file that defines the implementation class that implements the classloader object cache; and dynamically construct the implementation class that implements the classloader object cache from the class file.

6. The system of claim 5, where a path to the class file is defined within a module interface definition that defines the public interface to the classloader object cache and where, in being programmed to read the byte array from the class file that defines the implementation class that implements the classloader object cache, the processor is programmed to read the byte array from the class file via the path to the class file defined within the module interface definition.

7. The system of claim 1, where, in being programmed to instantiate the classloader object cache within the memory using the obtained classloader cache class definition, the processor is programmed to instantiate the classloader object cache within the memory as a hash map.

8. The system of claim 1, where, in being programmed to provide the public interface to the classloader object cache that operates as the weak reference to the classloader object cache and that provides external access to the classloader object cache, the processor is programmed to provide the public interface to the classloader object cache via a module interface definition.

9. A computer program product comprising a non-transitory computer readable storage medium including computer readable program code, where the computer readable program code when executed on a computer causes the computer to: obtain a classloader cache class definition that comprises code that creates a classloader object cache that is referenced via a strong internal reference by a classloader object in response to instantiation of the classloader cache class definition; instantiate the classloader object cache using the obtained classloader cache class definition, where the strong internal reference is created at instantiation of the classloader object cache; and provide a public interface to the classloader object cache that operates as a weak reference to the classloader object cache and that provides external access to the classloader object cache; where the strong internal reference comprises a static reference to the classloader obiect cache within an implementation class that implements the classloader obiect cache and the weak reference to the classloader object cache allows garbage collection of the classloader object cache to occur in response to the classloader obiect cache being unloaded.

10. The computer program product of claim 9, where the computer readable program code when executed on the computer further causes the computer to unload the classloader object cache, where the strong internal reference is unloaded with the classloader object cache and the classloader object cache is garbage collected.

11. The computer program product of claim 9, where, in causing the computer to instantiate the classloader object cache using the obtained classloader cache class definition, the computer readable program code when executed on the computer causes the computer to:
obtain the classloader of a current thread operated via the processor; and
instantiate the classloader object cache via reflection using a method interface of the current thread.

12. The computer program product of claim 11, where, in causing the computer to instantiate the classloader object cache via reflection using the method interface of the current thread, the computer readable program code when executed on the computer causes the computer to invoke a method of the implementation class that implements the classloader object cache.

13. The computer program product of claim 9, where, in causing the computer to instantiate the classloader object cache using the obtained classloader cache class definition, the computer readable program code when executed on the computer causes the computer to: read a byte array from a class file that defines the implementation class that implements the classloader object cache; and dynamically construct the implementation class that implements the classloader object cache from the class file.

14. The computer program product of claim 13, where a path to the class file is defined within a module interface definition that defines the public interface to the classloader object cache and where, in causing the computer to read the byte array from the class file that defines the implementation class that implements the classloader object cache, the computer readable program code when executed on the computer causes the computer to read the byte array from the class file via the path to the class file defined within the module interface definition.

15. The computer program product of claim 9, where, in causing the computer to instantiate the classloader object cache using the obtained classloader cache class definition, the computer readable program code when executed on the computer causes the computer to instantiate the classloader object cache as a hash map.

16. The computer program product of claim 9, where, in causing the computer to provide the public interface to the classloader object cache that operates as the weak reference to the classloader object cache and that provides external access to the classloader object cache, the computer readable program code when executed on the computer causes the computer to provide the public interface to the classloader object cache via a module interface definition.

* * * * *